(12) United States Patent
Lee et al.

(10) Patent No.: US 8,677,740 B2
(45) Date of Patent: Mar. 25, 2014

(54) METHOD FOR PREDICTING REGENERATION OF DENOX CATALYST AND EXHAUST SYSTEM USING THE SAME

(75) Inventors: Jin Ha Lee, Seoul (KR); Jin Woo Park, Suwon (KR); Christopher Severin, Aachen (DE); Thomas Wittka, Aachen (DE)

(73) Assignees: Hyundai Motor Company, Seoul (KR); Kia Motors Corporation, Seoul (KR); FEV Motorentechnik GmbH, Aachen (DE)

( * ) Notice: Subject to any disclaimer, the term of this patent is extended or adjusted under 35 U.S.C. 154(b) by 182 days.

(21) Appl. No.: 13/231,460

(22) Filed: Sep. 13, 2011

(65) Prior Publication Data

US 2012/0137661 A1    Jun. 7, 2012

(30) Foreign Application Priority Data

Dec. 2, 2010 (KR) .................. 10-2010-0121836

(51) Int. Cl.
*F01N 3/10* (2006.01)

(52) U.S. Cl.
USPC .................. 60/301; 60/286; 60/295

(58) Field of Classification Search
USPC .................. 60/277, 295, 301, 286
See application file for complete search history.

(56) References Cited

U.S. PATENT DOCUMENTS

| | | | |
|---|---|---|---|
| 6,829,885 B2 | 12/2004 | Surnilla et al. | |
| 2004/0031261 A1 | 2/2004 | Sun et al. | |
| 2005/0251318 A1 | 11/2005 | Wickert et al. | |
| 2009/0000274 A1 | 1/2009 | Stroh | |
| 2009/0044516 A1 | 2/2009 | Gabe et al. | |
| 2009/0044518 A1 | 2/2009 | Frouvelle et al. | |
| 2009/0165758 A1 | 7/2009 | Nishiumi et al. | |
| 2011/0099976 A1 | 5/2011 | Park | |

FOREIGN PATENT DOCUMENTS

| | | |
|---|---|---|
| JP | 2003-314328 A | 11/2003 |
| JP | 2004-324566 A | 11/2004 |
| JP | 2005-240682 A | 9/2005 |
| JP | 3903977 B2 | 1/2007 |
| JP | 4089690 B2 | 3/2008 |
| JP | 2009-209898 A | 9/2009 |
| KR | 10-0592414 B1 | 6/2006 |
| KR | 10-2007-0062207 A | 6/2007 |

*Primary Examiner* — Thomas Denion
*Assistant Examiner* — Philip Eklem
(74) *Attorney, Agent, or Firm* — Morgan, Lewis & Bockius LLP

(57) ABSTRACT

A method for predicting regeneration may include calculating total mass flow of reducing agent, calculating mass flow of the reducing agent used in nitrate reduction reaction, mass flow of the reducing agent used in NO2 reduction reaction, and mass flow of the reducing agent which is simply oxidized by using the total mass flow of the reducing agent, calculating mass flow of released NO2 and mass flow of reduced NO2 by using the mass flow of the reducing agent used in the nitrate reduction reaction and the mass flow of the reducing agent used in the NO2 reduction reaction, calculating mass flow of NO2 slipped from DeNOx catalyst, and calculating mass of NO2 and mass of NOx remaining at the DeNOx catalyst after regeneration based on the mass flow of the released NO2, the mass flow of the reduced NO2, and the mass flow of the slipped NO2.

18 Claims, 4 Drawing Sheets

METHOD FOR PREDICTING REGENERATION OF DENOX CATALYST AND EXHAUST SYSTEM USING THE SAME

CROSS-REFERENCE TO RELATED APPLICATION

This application claims priority and the benefit of Korean Patent Application No. 10-2010-0121836 filed Dec. 2, 2010, the entire contents of which application is incorporated herein for all purposes by this reference.

BACKGROUND OF INVENTION

1. Field of Invention

The present invention relates to a method for predicting regeneration of a DeNOx catalyst and an exhaust system using the same. More particularly, the present invention relates to a method for predicting regeneration of a DeNOx catalyst which can precisely predicting NOx amount and NO2 amount remaining in the DeNOx catalyst after regeneration and to exhaust system which controls regeneration timing of the DeNOx catalyst and injection amount of reducing agent using the method.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matters (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst absorbs the NOx contained in the exhaust gas when the engine operates in a lean atmosphere, and releases the absorbed NOx when the engine operates in a rich atmosphere. The release of the absorbed NOx from the LNT catalyst is called regeneration.

According to a conventional method for regenerating the LNT catalyst, the NOx amount contained in the exhaust gas is predicted based on a driving condition of the engine, the NOx amount stored in the LNT catalyst is predicted from the NOx amount contained in the exhaust gas, and the reducing agents are injected or combustion atmosphere is controlled when the NOx amount stored in the LNT catalyst is larger than or equal to a predetermined amount. In order to perform the conventional method for regenerating the LNT catalyst successfully, the NOx amount stored in the LNT catalyst should be predicted precisely. In addition, in order to predict the NOx amount stored in the LNT catalyst, the NOx amount contained in the exhaust gas and NOx and NO2 amounts remaining in the LNT catalyst after previous regeneration should be predicted precisely. A method for precisely predicting the NOx amount contained in the exhaust gas is disclosed in Korean patent application Nos. 10-2010-0115239 and 10-2010-0115238. Therefore, a method for precisely predicting the NOx and NO2 amounts remaining in the LNT catalyst after the previous regeneration will hereinafter be disclosed in this specification.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method for predicting regeneration of a DeNOx catalyst having advantages of precisely predicting amount of NOx and NO2 remaining in the DeNOx catalyst after regeneration considering of amount of reducing agent actually used in reduction reaction of the NOx and aging of the DeNOx catalyst.

Various aspects of the present invention provide for an exhaust system having advantages of precisely predicting regeneration timing of the DeNOx catalyst and injection amount of the reducing agent according to predicted regeneration state of the NOx.

A method for predicting regeneration of a DeNOx catalyst according to various aspects of the present invention may include calculating total mass flow of reducing agent, calculating mass flow of the reducing agent used in nitrate reduction reaction, mass flow of the reducing agent used in NO2 reduction reaction, and mass flow of the reducing agent which is simply oxidized by using the total mass flow of the reducing agent, calculating mass flow of released NO2 and mass flow of reduced NO2 by using the mass flow of the reducing agent used in the nitrate reduction reaction and the mass flow of the reducing agent used in the NO2 reduction reaction, calculating mass flow of NO2 slipped from DeNOx catalyst, and calculating mass of NO2 and mass of NOx remaining at the DeNOx catalyst after regeneration based on the mass flow of the released NO2, the mass flow of the reduced NO2, and the mass flow of the slipped NO2.

The total mass flow of the reducing agent may be calculated by using utilization efficiency of the reducing agent and mass flow of the injected reducing agent.

The utilization efficiency of the reducing agent may be calculated by using mass flow of an exhaust gas and aging of the DeNOx catalyst.

The mass flow of the reducing agent used in the nitrate reduction reaction may be calculated by using temperature of the DeNOx catalyst, a lambda of an inlet of the DeNOx catalyst, the mass of the NOx stored in the DeNOx catalyst, and the total mass flow of the reducing agent.

The mass flow of the reducing agent used in the NO2 reduction reaction may be calculated by using the mass of the NO2 stored in the DeNOx catalyst, the temperature of the DeNOx catalyst, and the total mass flow of the reducing agent.

The mass flow of the reducing agent which is simply oxidized may be calculated by using the temperature of the DeNOx catalyst, a lambda of an engine outlet, and the total mass flow of the reducing agent.

The mass flow of the NO2 slipped from the DeNOx catalyst may be calculated by using NO2 slip efficiency, the mass of the NO2 stored in the DeNOx catalyst, and the temperature of the DeNOx catalyst.

The NO2 slip efficiency may be calculated by using the aging of the DeNOx catalyst, initial slip efficiency of the DeNOx catalyst, and slip efficiency of the aged DeNOx catalyst.

An exhaust system according to various aspects of the present invention may include an exhaust pipe through which an exhaust gas flows, the exhaust gas being generated at an engine having a first injector injecting a fuel into a combustion chamber, a second injector mounted at the exhaust pipe and injecting a reducing agent, a DeNOx catalyst mounted at the exhaust pipe downstream of the second injector and reducing NOx contained in the exhaust gas by using the reducing agent injected by the second injector, and a control unit controlling the second injector so as to regenerate the DeNOx catalyst and calculating mass of NO2 and mass of the NOx remaining in the DeNOx catalyst after regeneration, wherein the control unit calculates total mass flow of the reducing agent used in the regeneration of the DeNOx catalyst, calculates each mass flow of the reducing agent used respectively in nitrate reduction reaction, NO2 reduction reaction, and simple oxidation reaction of the reducing agent, and calculates mass flow of the NO2 released from the DeNOx catalyst and mass flow of reduced NO2 by using each mass flow of the reducing agent.

The control unit may calculate mass flow of the NO2 slipped from the DeNOx catalyst from NO2 slip efficiency, mass of the NO2 stored in the DeNOx catalyst, and temperature of the DeNOx catalyst.

The control unit may calculate the mass of the NO2 and the mass of the NOx remaining in the DeNOx catalyst after the regeneration from the mass flow of the NO2 released from the DeNOx catalyst, the mass flow of the reduced NO2, and the mass flow of the slipped NO2.

The control unit may calculate the total mass flow of the reducing agent from utilization efficiency of the reducing agent and mass flow of the injected reducing agent.

The control unit may calculate the utilization efficiency of the reducing agent from mass flow of the exhaust gas and aging of the DeNOx catalyst.

The control unit may calculate the mass flow of the reducing agent used in the nitrate reduction reaction from the temperature of the DeNOx catalyst, a lambda of an inlet of the DeNOx catalyst, the mass of the NOx stored in the DeNOx catalyst, and the total mass flow of the reducing agent.

The control unit may calculate the mass flow of the reducing agent used in the NO2 reduction reaction from the mass of the NO2 stored in the DeNOx catalyst, the temperature of the DeNOx catalyst, and the total mass flow of the reducing agent.

The control unit may calculate the mass flow of the reducing agent used in the simple oxidation reaction of the reducing agent from the temperature of the DeNOx catalyst, a lambda of an engine outlet, and the total mass flow of the reducing agent.

The control unit may calculate the NO2 slip efficiency from the aging of the DeNOx catalyst, initial slip efficiency of the DeNOx catalyst, and slip efficiency of the aged DeNOx catalyst.

The reducing agent may be a fuel.

The exhaust system may be mounted on the exhaust pipe between the second injector and the DeNOx catalyst and may further include a fuel cracking catalyst for decomposing the fuel.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
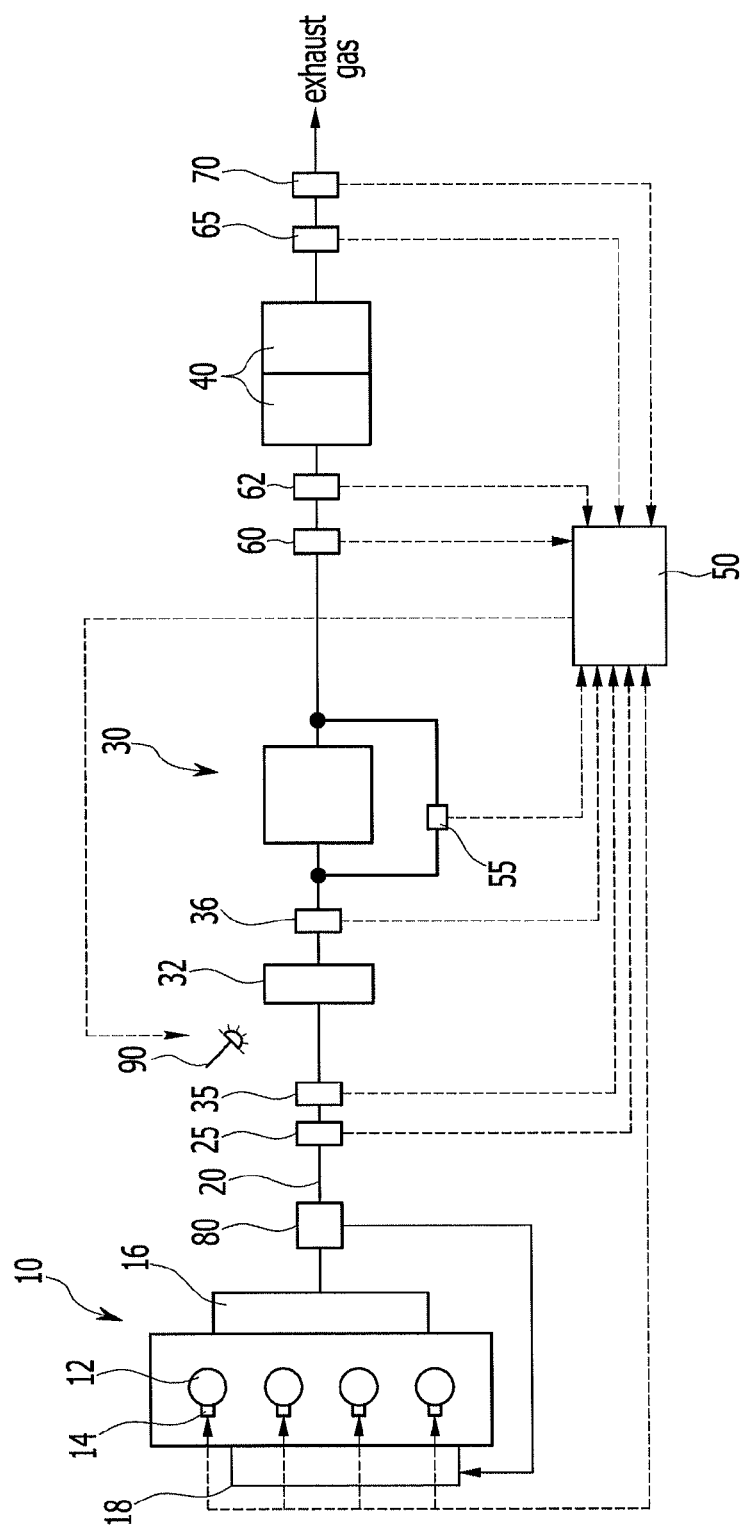
FIG. 1 is a schematic diagram of an exhaust system to which an exemplary method for predicting regeneration of a DeNOx catalyst according to the present invention can be applied.

As shown in FIG. 1, an exhaust system for an internal combustion engine includes an engine 10, an exhaust pipe 20, an exhaust gas recirculation (EGR) apparatus 80, a fuel cracking catalyst 32, a particulate filter 30, a DeNox catalyst 40, and a control unit 50.

The engine 10 burns an air-fuel mixture in which fuel and air are mixed so as to convert chemical energy into mechanical energy. The engine 10 is connected to an intake manifold 18 so as to receive the air in a combustion chamber 12, and is connected to an exhaust manifold 16 such that exhaust gas generated in a combustion process is gathered in the exhaust manifold 16 and is exhausted to the exterior. A first injector 14 is mounted in the combustion chamber 12 so as to inject the fuel into the combustion chamber 12.

A diesel engine is exemplified herein, but a lean-burn gasoline engine may be used. In a case that the gasoline engine is used, the air-fuel mixture flows into the combustion chamber 12 through the intake manifold 18, and a spark plug is mounted at an upper portion of the combustion chamber 12.

In addition, an engine having various compression ratios, a compression ration lower than or equal to 16.5, may be used.

The exhaust pipe 20 is connected to the exhaust manifold 16 so as to exhaust the exhaust gas to the exterior of a vehicle. The particulate filter 30 and the DeNOx catalyst 40 are mounted at the exhaust pipe 20 so as to remove HC, CO, PM, and NOx contained in the exhaust gas.

The exhaust gas recirculation apparatus 80 is mounted at the exhaust pipe 20, and the exhaust gas exhausted from the engine 10 passes through the exhaust gas recirculation apparatus 80. In addition, the exhaust gas recirculation apparatus 80 is connected to the intake manifold 18 so as to control the combustion temperature by mixing a portion of the exhaust gas with the air. Such control of the combustion temperature is performed by controlling an amount of the exhaust gas supplied to the intake manifold 18 by control of the control unit 50.

A first oxygen sensor 25 is mounted at the exhaust pipe 20 downstream of the exhaust gas recirculation apparatus 80, and detects oxygen amount in the exhaust gas passing through the exhaust gas recirculation apparatus 80. In this specification, the detected value by the first oxygen sensor is called a lambda of an engine outlet.

The second injector 90 is mounted at the exhaust pipe 20 downstream of the exhaust gas recirculation apparatus 80, is electrically connected to the control unit 50, and performs additional injection of fuel into the exhaust pipe 20 according to control of the control unit 50.

The particulate filter 30 is mounted at the exhaust pipe 20 downstream of the second injector 90. A fuel cracking catalyst is provided at upstream of the particulate filter 30. In this case, the fuel cracking catalyst 32 is disposed between the second injector 90 and the DeNOx catalyst 40. Herein, the fuel cracking catalyst 32 is provided separately from the particulate filter 30, but the fuel cracking catalyst 32 may be coated at a front portion of the particulate filter 30.

The fuel cracking catalyst 32 cuts a chain ring of carbon compounds contained in the fuel through the catalyst reaction so as to decompose the carbon compounds. That is, the fuel cracking catalyst 32 cuts the chain ring constituting hydrocarbon and decomposes the fuel through thermal cracking. Therefore, effective reaction area of the additionally injected fuel increases, and thereby hydrocarbon including high-reactivity oxygen (oxygenated HC), CO, and H2 are produced.

Thermal cracking proceeds as follows.

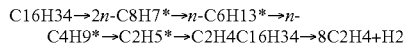

Here, * means a radical.

Herein, the hydrocarbon represents all compounds consisting of carbon and hydrogen contained in the exhaust gas and the fuel.

A particulate matter filtering device 30 which is one type of the particulate filter 30 is mounted at downstream of the fuel cracking catalyst 32, and traps particulate matters (PM) contained in the exhaust gas exhausted through the exhaust pipe 20. In this specification, the particulate matter filtering device 30 and the particulate filter 30 are used for representing the same filter. However, other types of particulate filter 30 (e.g., catalyst particulate filter (CPF)) may be used instead of using the particulate matter filtering device 30.

In addition, an oxidizing catalyst may be coated at the particulate filter 30. Such an oxidizing catalyst oxidizes HC and CO contained in the exhaust gas into CO2, and oxidizes NO contained in the exhaust gas into NO2. The oxidizing catalyst may be coated mainly at a specific region of the particulate filter 30 or may be coated uniformly at an entire region of the particulate filter 30.

A first temperature sensor 35 is mounted at the exhaust pipe 20 upstream of the fuel cracking catalyst 32, and detects an inlet temperature of the fuel cracking catalyst 32. A second temperature sensor 36 is mounted at downstream of the fuel cracking catalyst 32, and detects an outlet temperature of the fuel cracking catalyst 32 or an inlet temperature of the particulate filter 30.

Meanwhile, a pressure difference sensor 55 is mounted at the exhaust pipe 20. The pressure difference sensor 55 detects a pressure difference between an inlet and an outlet of the particulate filter 30, and transmits a signal corresponding thereto to the control unit 50. The control unit 50 controls the particulate filter 30 to be regenerated when the pressure difference detected by the pressure difference sensor 55 is higher than or equal to a first predetermined pressure. In this case, the first injector 14 can post-inject fuel so as to burn the PM trapped in the particulate filter 30. On the contrary, the second injector 90 can additionally inject the fuel so as to regenerate the particulate filter 30.

The DeNOx catalyst 40 is mounted at the exhaust pipe 20 downstream of the particulate filter 30. The DeNOx catalyst 40 absorbs the NOx contained in the exhaust gas, and releases the absorbed NOx by the additional injection of the fuel. In addition, the DeNOx catalyst 40 performs a reduction reaction of the released NOx so as to purify the NOx contained in the exhaust gas.

A third temperature sensor 60 and a fourth temperature sensor 65 are mounted respectively at upstream and downstream of the DeNOx catalyst 40 so as to detect an inlet temperature and an outlet temperature of the DeNOx catalyst 40. Herein, the DeNOx catalyst 40 is divided into two parts. Why the DeNOx catalyst 40 is divided into two parts is that metal ratio coated at each part may be changed so as to perform a specific function. For example, heat-resisting ability of a first part 40 close to the engine 10 is strengthened by increasing palladium (Pd) ratio, and slip of hydrocarbon from a second part 40 is prevented by increasing platinum (Pt) ratio. On the contrary, the DeNOx catalyst 40 in which the same metal ratio is coated at an entire region may be used.

In addition, a second oxygen sensor 62 is mounted at the exhaust pipe 20 upstream of the DeNox catalyst 40 and a third oxygen sensor 70 is mounted at the exhaust pipe 20 downstream of the DeNox catalyst 40. The second oxygen sensor 62 detects oxygen amount contained in the exhaust gas flowing into the DeNox catalyst 40 and transmits a signal corresponding thereto to the control unit 50 so as to help the control unit 50 perform lean/rich control of the exhaust gas. In addition, the third oxygen sensor 70 is used for monitoring whether the exhaust system for an internal combustion engine according to various embodiments of the present invention normally purifies noxious materials contained in the exhaust gas. Herein, it is exemplary described in this specification that the second oxygen sensor 62 is additionally mounted at the exhaust pipe 20. However, instead of additionally mounting the second oxygen sensor 62 at the exhaust pipe 20, the oxygen amount contained in the exhaust gas flowing into the DeNox catalyst 40 may be estimated based on at least one of detected values of the first oxygen sensor 25 and the third oxygen sensor 70, fuel consumption, and engine operating history. In this specification, the detected value by the second oxygen sensor 62 is called a lambda of an inlet of the DeNOx catalyst.

The control unit 50 determines a driving condition of the engine based on signals transmitted from each sensor, and controls additional injection amount and additional injection timing of the fuel based on the driving condition of the engine. Thereby, the control unit 50 controls the DeNox catalyst 40 to release the absorbed NOx. For example, in a case that NOx amount absorbed in the DeNOx catalyst 40 is larger than or equal to a predetermined value, the control unit 50 controls the fuel to be additionally injected.

In addition, the control unit 50 controls a ratio of the HC to the NOx in the exhaust gas to be larger than or equal to a predetermined ratio so as to activate reduction reaction of the NOx in the DeNox catalyst 40. The predetermined ratio may be 5.

Meanwhile, the control unit 50 calculates the NOx amount stored in the DeNox catalyst 40, slip amount of the NOx from a rear portion of the DeNox catalyst 40, and the ratio of the NOx to the NOx based on the driving condition of the engine. Such calculation is done according to a map table defined by various experiments.

In addition, the control unit 50 changes injection pattern of the fuel injected by the second injector 90 according to the driving condition of the engine, state of the engine, or state of the DeNox catalyst 40. Here, the state of the engine is assumed by considering operating period of the engine, and the state of the DeNox catalyst 40 is assumed by considering aging of the DeNox catalyst 40.

Further, the control unit 50 performs the regeneration of the particulate filter 30.

Meanwhile, the control unit 50 may control the first injector 14 to post-inject the fuel so as to activate the reduction reaction of the NOx in the DeNox catalyst 40 instead of additional injection of the second injector 90. In this case, the post-injected fuel is converted into high-reactivity reducing agent at the fuel cracking catalyst 32, and promotes the reduction reaction of the NOx in the DeNox catalyst 40. Therefore, it is to be understood that the additional injection includes the post-injection in this specification and claim sets.

In this specification, it is exemplifies that an LNT catalyst is used as the DeNox catalyst 40, but is not limited thereto.

Hereinafter, one example of the DeNox catalyst 40 will be described in detail.

The DeNox catalyst 40 includes first and second catalyst layers coated on a carrier. The first catalyst layer is disposed close to the exhaust gas, and the second catalyst layer is disposed close to the carrier.

The first catalyst layer oxidizes the NOx contained in the exhaust gas, and reduces a portion of the oxidized NOx through oxidation-reduction reaction with the HC contained in the unburned fuel or the exhaust gas. In addition, the remaining portion of the oxidized NOx is diffused into the second catalyst layer.

The second catalyst layer absorbs the NOx diffused from the first catalyst layer, and releases the absorbed NOx by additionally injected fuel such that the absorbed NOx is reduced at the first catalyst layer. The NOx diffused to the second catalyst layer is absorbed at the second catalyst layer as a nitrate ($NO_3^-$) type. In addition, the NOx released from the second catalyst layer is changed into NO2 type and moves to the first catalyst layer. A portion of the NO2 is reduced, another portion of the NO2 slips, and the other portion of the NO2 is absorbed at the first catalyst layer.

The second catalyst layer includes an adsorption material. Weak alkaline oxides are used as such an adsorption material. Oxides containing alkali metals or alkali earth metals are used as the weak alkaline oxides, and more particularly oxides containing barium may be used as the weak alkaline oxides.

Hereinafter, operation of the DeNox catalyst 40 will be described in detail.

In a case that the fuel is not additionally injected from the second injector 90, the NOx contained in the exhaust gas is oxidized in the first catalyst layer. A portion of the oxidized NOx is reduced into N2 through the oxidation-reduction reaction with the HC contained in the exhaust gas. At this stage, the HC contained in the exhaust gas is oxidized into CO2.

In addition, the remaining portion of the oxidized NOx and the NOx contained in the exhaust gas are diffused into the second catalyst layer and are absorbed therein.

In a case that the fuel is additionally injected from the second injector 90, the additionally injected fuel passes through the fuel cracking catalyst, and the fuel is converted into the HC of the low molecule at this time. In addition, the portion of the HC of the low molecule is converted into the oxygenated HC and passes through the DeNox catalyst 40.

At this time, the NOx is released from the second catalyst layer through the substituted reaction with the HC. In addition, the NOx is reduced into the N2 and the HC and the oxygenated HC are oxidized into the CO2 in the first catalyst layer through the oxidation-reduction reaction of the released NOx with the HC and the oxygenated HC.

Therefore, the NOx and the HC contained in the exhaust gas are purified.

Figure 2:
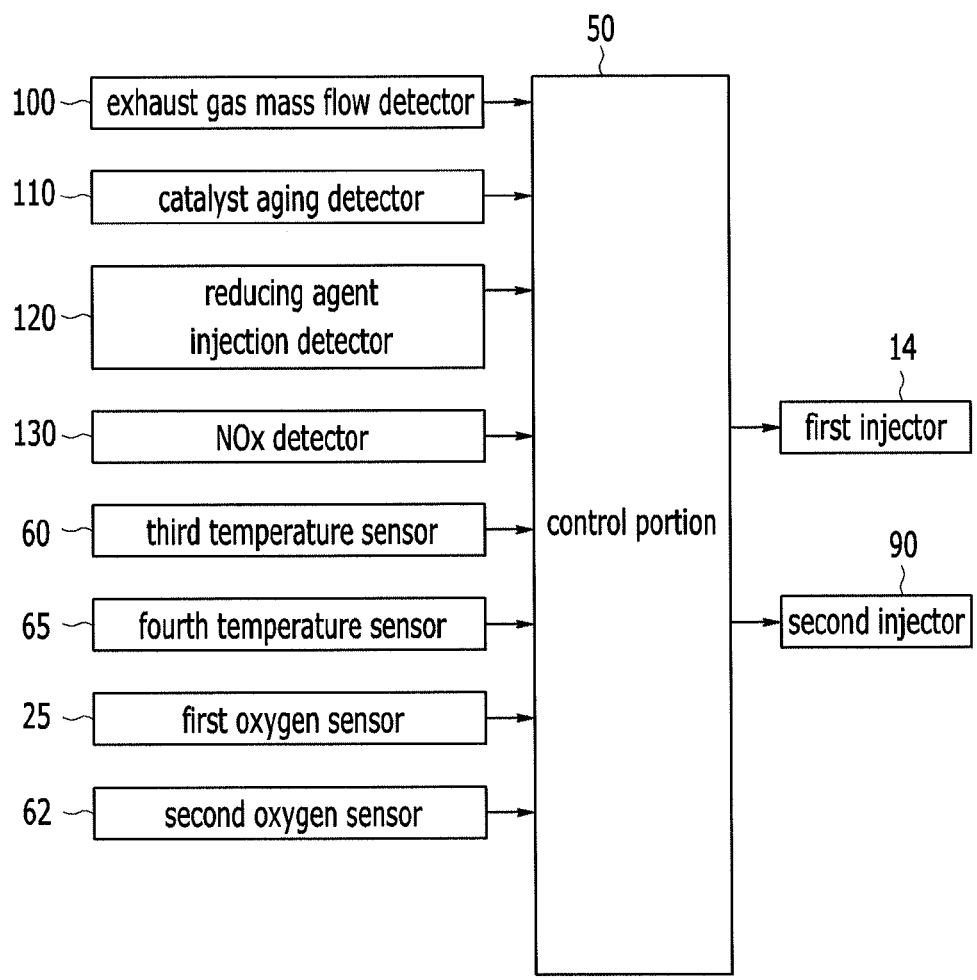
FIG. 2 is a block diagram illustrating a relationship of an input and output of a control unit used in an exemplary method for predicting regeneration of a DeNOx catalyst according to the present invention.

As shown in FIG. 2, an exhaust gas mass flow detector 100, a catalyst aging detector 110, a reducing agent injection detector 120, an NOx detector 130, the third temperature sensor 60, the fourth temperature sensor 65, the first oxygen sensor 25, and the second oxygen sensor 62 are electrically connected to the control unit 50, and detected values thereof are transmitted to the control unit 50.

The exhaust gas mass flow detector 100 detects mass flow of the exhaust gas passing through the exhaust pipe 20.

The catalyst aging detector 110 detects aging of the DeNOx catalyst 40. The catalyst aging may be determined considering the operating history of the engine 10, regeneration history of the DeNOx catalyst 40, and temperature difference between the inlet and the outlet of the DeNOx catalyst 40 after regeneration.

The reducing agent injection detector 120 detects current injection amount of the reducing agent. Because the injection amount of the reducing agent is duty-controlled by the control unit 50, the current injection amount of the reducing agent can be detected by reading a current duty value.

The third temperature sensor 60 detects the inlet temperature of the DeNOx catalyst 40.

The fourth temperature sensor 65 detects the outlet temperature of the DeNOx catalyst 40.

The temperatures detected by the third temperature sensor 60 and the fourth temperature sensor 65 are used to determine temperature of the DeNOx catalyst 40 through predetermined calculation. On the contrary, the inlet temperature of the DeNOx catalyst 40 or the outlet temperature of the DeNOx catalyst 40 can be used as the temperature of the DeNOx catalyst 40.

The first oxygen sensor 25 detects oxygen amount contained in the exhaust gas passing the EGR apparatus 80. As described above, the detected value by the first oxygen sensor 25 is represented as the lambda of the engine outlet.

The second oxygen sensor 62 detects oxygen amount contained in the exhaust gas flowing into the DeNOx catalyst 40. As described above, the detected value by the second oxygen sensor 62 is represented as the lambda of the inlet of the DeNOx catalyst 40.

The control unit 50 determines the driving condition of the engine, the fuel injection amount, the fuel injection timing, the fuel injection pattern, the additional injection amount of the fuel (i.e., the injection amount of the reducing agent), the additional injection timing (i.e., regeneration timing) and the additional injection pattern based on the detected values, and outputs a signal for controlling the first and second injectors 14 and 90 to the first and second injectors 14 and 90. In addition, the control unit 50 controls the regeneration of the particulate filter 30 based on the detected value by the pressure difference sensor 55. As described above, the regeneration of the particulate filter 30 is performed by the post-injection of the first injector 14 or the additional injection of the second injector 90. Furthermore, the control unit 50 calculates mass flow of NO2 released from the second catalyst layer, mass flow of NO2 reduced into nitrogen gas, and mass flow of NO2 slipped from DeNOx catalyst 40, and calculates mass of nitrate remaining at the second catalyst layer and mass of NO2 remaining at the first catalyst layer after regeneration based thereon.

Meanwhile, the exhaust system of the internal combustion engine according to various embodiments of the present invention includes a plurality of sensors except the sensors shown in FIG. 2, but description thereof will be omitted for better comprehension and ease of description.

Figure 3:
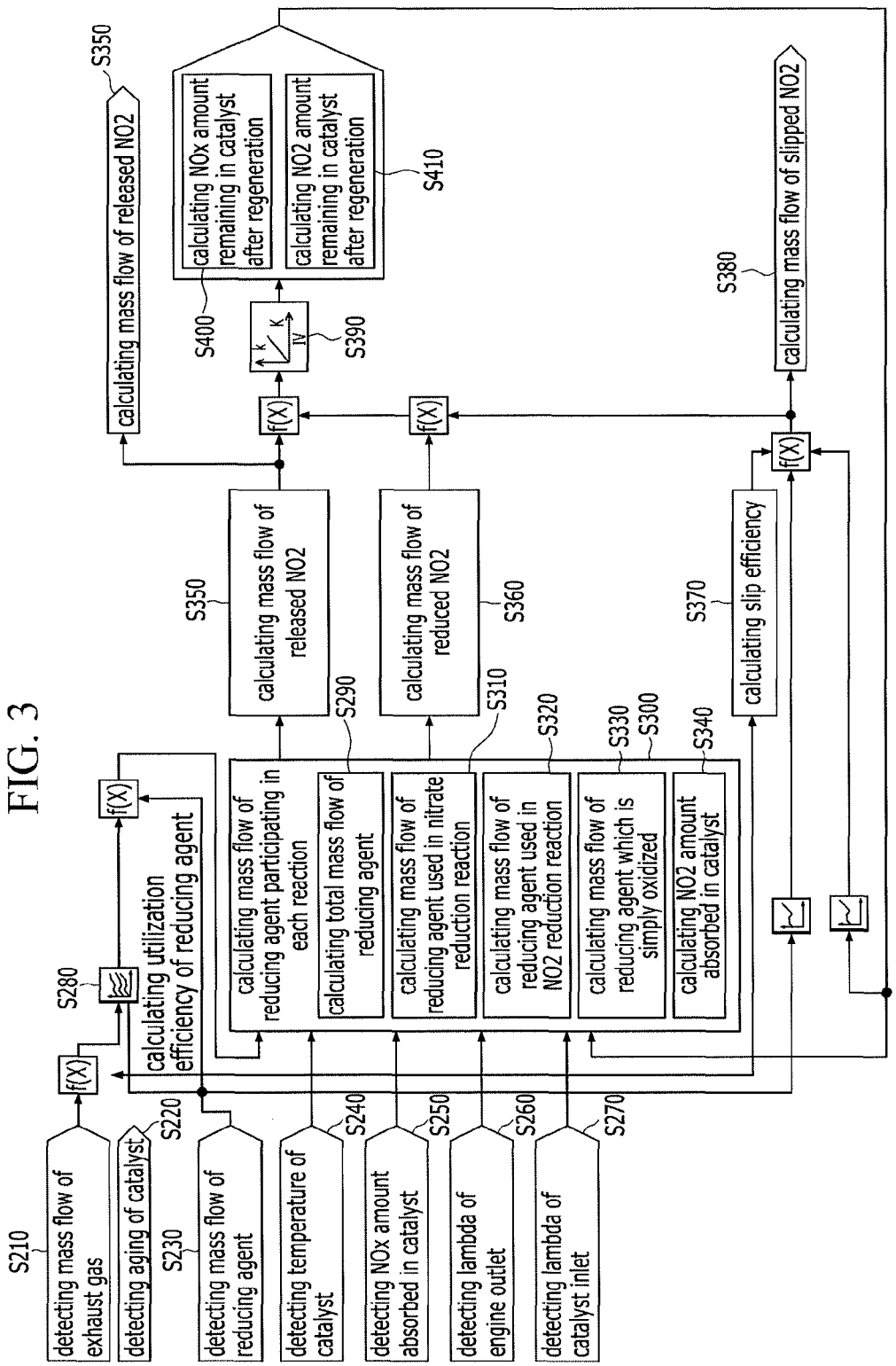
FIG. 3 is a flowchart of an exemplary method for predicting regeneration of a DeNOx catalyst according to the present invention.
Figure 4:
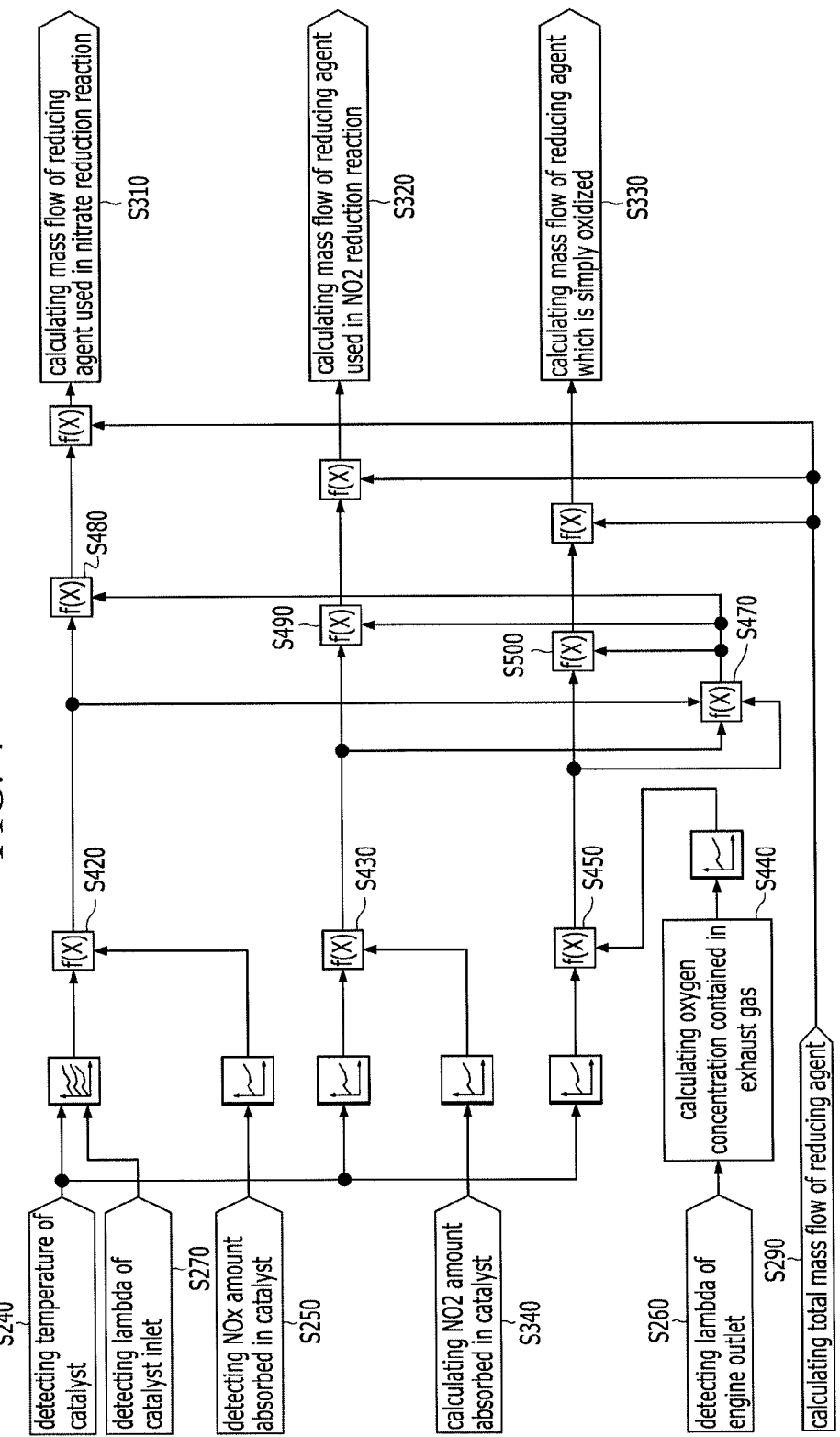
FIG. 4 is a flowchart illustrating calculation of each mass flow of reducing agent participating in each reaction in various embodiments of the present invention.

With reference to FIG. 3 and FIG. 4, the exhaust gas mass flow detector 100 detects the mass flow of the exhaust gas at a step S210, the catalyst aging detector 110 detects the aging of the DeNOx catalyst 40 at a step S220, the reducing agent injection detector 120 detects the mass flow of the reducing agent injected into the exhaust gas at a step S230, and the temperature of the DeNOx catalyst 40 is detected based on the detected values of the third and fourth temperature sensors 60 and 65 at a step S240.

In addition, the control unit 50 detects the NOx amount absorbed in the DeNOx catalyst 40 based on the NOx amount remaining at the second catalyst layer and the NOx amount newly absorbed at the second catalyst layer after the previous regeneration at a step S250, the first oxygen sensor 25 detects the lambda of the engine outlet at a step S260, and the second oxygen sensor 62 detects the lambda of the catalyst inlet at a step S270. Meanwhile, due to inaccuracy and time delay reasons of the first and second oxygen sensors 25 and 62, the lambdas of the outlet of the engine and the inlet of the DeNOx catalyst 40 may be calculated from the following equations.

$$\lambda_{ExhMnf} = \frac{m_{Air}}{m_{Fuel} \cdot L_{st}}$$

$$\lambda_{LntUs} = \frac{m_{Air}}{\left(m_{Fuel,int} + \frac{\dot{m}_{Fuel,ext} \cdot 60 \text{ s/min}}{n \cdot i \cdot z}\right) L_{st}}$$

Herein, $\lambda_{ExhMnf}$ denotes the lambda of the outlet of the engine, $m_{Air}$ denotes the mass of the fresh air, $m_{Fuel}$ and $M_{Fuel,int}$ denote the fuel amount injected to the engine, $\dot{m}_{Fuel,ext}$ denotes mass flow of the reducing agent, $L_{st}$ denotes a stoichiometric air/fuel ratio, n denotes the engine speed, i denotes the number of combustion cycles, and z denotes the number of the cylinders.

The control unit 50 calculates utilization efficiency of the reducing agent from a predetermined map by using the mass flow of the exhaust gas and the aging of the DeNOx catalyst 40 at a step S280, and calculates total mass flow of the reducing agent participating in reactions occurring in the DeNOx catalyst 40 by using the utilization efficiency of the reducing agent and the mass flow of the injected reducing agent at a step S290.

After that, the control unit 50 calculates the mass flow of the reducing agent participating in each reaction at a step S300.

Hereinafter, calculation of the mass flow of the reducing agent participating in each reaction will be described in detail referring to FIG. 4.

The control unit 50 calculates a first reaction coefficient k1 for calculating the mass flow of the reducing agent used in nitrate reduction reaction from a predetermined map by using the temperature of the DeNOx catalyst 40, the lambda of the inlet of the DeNOx catalyst 40, and the NOx amount stored in the DeNOx catalyst 40 at a step S420.

In addition, the control unit 50 calculates a second reaction coefficient k2 for calculating the mass flow of the reducing agent used in NO2 reduction reaction from a predetermined map by using the temperature of the DeNOx catalyst 40 and the NO2 amount absorbed in the DeNOx catalyst 40 at a step S430. The control unit 50 detects the NO2 amount absorbed in the DeNOx catalyst 40 by using the NO2 amount remaining in the DeNOx catalyst 40 and the newly absorbed in the DeNOx catalyst 40 after the previous regeneration at a step S340.

In addition, the control unit 50 calculates oxygen concentration contained in the exhaust gas by using the lambda of the engine 10 at a step S440, and calculates a third reaction coefficient k3 for calculating the mass flow of the reducing agent used in simple oxidation reaction with oxygen by using the temperature of the DeNOx catalyst 40 and the oxygen concentration contained in the exhaust gas at a step S450.

After that, the control unit 50 calculates a total reaction coefficient k by summing up the first, second, and third reaction coefficients k1, k2, and k3 at a step S470, calculates a first reaction coefficient ratio r1 by dividing the first reaction coefficient k1 by the total reaction coefficient k at a step S480, calculates a second reaction coefficient ratio r2 by dividing the second reaction coefficient k2 by the total reaction coefficient k at a step S490, and calculates a third reaction coefficient ratio r3 by dividing the third reaction coefficient k3 by the total reaction coefficient k at a step S500.

After that, the control unit 50 calculates the mass flow of the reducing agent used in the nitrate reduction reaction by using the first reaction coefficient ratio r1 and the total mass flow of the reducing agent at a step S310, calculates the mass flow of the reducing agent used in the NO2 reduction reaction by using the second reaction coefficient ratio r2 and the total mass flow of the reducing agent at a step S320, and calculates the mass flow of the reducing agent which is simply oxidized by using the third reaction coefficient ratio r3 and the total mass flow of the reducing agent at a step S330.

After the mass flow of the reducing agent used in each reaction is calculated at the step S300, the control unit 50 calculates the mass flow of the NO2 released from the second catalyst layer at a step S350. The mass flow of the NO2 released from the second catalyst layer is calculated based on Equation 1.

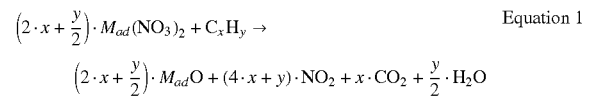

Equation 1

If barium (Ba) is used as $M_{ad}$ (alkali or alkali earth metal) and $C_3H_6$ is used as $C_xH_y$, Equation 1 is as follows.

$$9*BaNO_{32}+C_3H_6 \rightarrow 9*BaO+18NO_2+3*CO_2+3*H_2O$$

Therefore, the mass flow of the NO2 released from the second catalyst layer can be calculated from the total mass flow of the reducing agent, the first reaction coefficient ratio, molar mass of the NO2, and molar mass of the reducing agent by using Equation 1.

In addition, the control unit 50 calculates the mass flow of the NO2 reduced from the first catalyst layer at a step S360. The mass flow of the NO2 reduced from the first catalyst layer is calculated based on Equation 2.

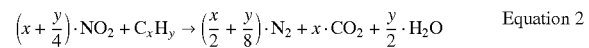

Equation 2

If $C_3H_6$ is used as $C_xH_y$, Equation 2 is as follows.

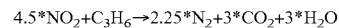

Therefore, the mass flow of the NO2 reduced from the first catalyst layer can be calculated from the total mass flow of the reducing agent, the second reaction coefficient ratio, the molar mass of the NO2, and the molar mass of the reducing agent by using Equation 2.

In addition, the control unit 50 calculates the mass flow of the reducing agent which is simply oxidized based on Equation 3 at a step S330.

$$C_xH_y + \left(x + \frac{y}{4}\right) \cdot O_2 \to x \cdot CO_2 + \frac{y}{2} \cdot H_2O \qquad \text{Equation 3}$$

If $C_3H_6$ is used as $C_xF_y$, Equation 3 is as follows.

$$C_3H_6 + 4.5*O_2 \to 3*CO_2 + 3*H_2O$$

The control unit 50 calculates current slip efficiency of the DeNOx catalyst 40 by using the aging of the DeNOx catalyst 40, initial slip efficiency of the DeNOx catalyst 40, and slip efficiency of the aged DeNOx catalyst 40 at a step S370. In addition, the control unit 50 calculates mass flow of slipped NO2 by using the current slip efficiency of the DeNOx catalyst 40, the temperature of the DeNOx catalyst 40, and the NO2 amount absorbed in the DeNOx catalyst 40 at a step S380. After that, the control unit 50 integrates value calculated by subtracting the mass flow of the reduced NO2 and the mass flow of the slipped NO2 from the mass flow of the released NO2 at a step S390.

Therefore, the NOx amount remaining in the DeNOx catalyst 40 after the regeneration is calculated at a step S400, and the NO2 amount remaining in the DeNOx catalyst 40 after the regeneration is calculated at a step S410.

As described above, since NOx amount and NO2 amount remaining in the DeNOx catalyst after regeneration can be precisely predicted and be utilized for the following regeneration, purification efficiency of NOx may be improved according to the present invention.

Since regeneration timing and injection amount of reducing agents is controlled according to precise NOx amount and NO2 amount absorbed in the DeNOx catalyst, fuel economy may be improved.

In addition, since the precise NOx amount and NO2 amount absorbed in the DeNOx catalyst can be predicted, overdesign of the DeNOx catalyst may be prevented and amount of a noble metal used in the DeNOx catalyst may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust system comprising:
    an exhaust pipe through which an exhaust gas flows, the exhaust gas being generated by an engine having a first injector injecting a fuel into a combustion chamber;
    a second injector mounted at the exhaust pipe and injecting a reducing agent;
    a DeNOx catalyst mounted at the exhaust pipe downstream of the second injector and reducing NOx contained in the exhaust gas by using the reducing agent injected by the second injector; and
    a control unit controlling the second injector so as to regenerate the DeNOx catalyst and calculating mass of NO2 and mass of the NOx remaining in the DeNOx catalyst after regeneration,
    wherein the control unit calculates total mass flow of the reducing agent used in the regeneration of the DeNOx catalyst, calculates each mass flow of the reducing agent used respectively in nitrate reduction reaction, NO2 reduction reaction, and simple oxidation reaction of the reducing agent, and calculates mass flow of the NO2 released from the DeNOx catalyst and mass flow of reduced NO2 by using each mass flow of the reducing agent.

2. The exhaust system of claim 1, wherein the control unit calculates mass flow of the NO2 slipped from the DeNOx catalyst from NO2 slip efficiency, mass of the NO2 stored in the DeNOx catalyst, and temperature of the DeNOx catalyst.

3. The exhaust system of claim 2, wherein the control unit calculates the mass of the NO2 and the mass of the NOx remaining in the DeNOx catalyst after the regeneration from the mass flow of the NO2 released from the DeNOx catalyst, the mass flow of the reduced NO2, and the mass flow of the slipped NO2.

4. The exhaust system of claim 1, wherein the control unit calculates the total mass flow of the reducing agent from utilization efficiency of the reducing agent and mass flow of the injected reducing agent.

5. The exhaust system of claim 4, wherein the control unit calculates the utilization efficiency of the reducing agent from mass flow of the exhaust gas and aging of the DeNOx catalyst.

6. The exhaust system of claim 1, wherein the control unit calculates the mass flow of the reducing agent used in the nitrate reduction reaction from the temperature of the DeNOx catalyst, a lambda of an inlet of the DeNOx catalyst, the mass of the NOx stored in the DeNOx catalyst, and the total mass flow of the reducing agent.

7. The exhaust system of claim 1, wherein the control unit calculates the mass flow of the reducing agent used in the NO2 reduction reaction from the mass of the NO2 stored in the DeNOx catalyst, the temperature of the DeNOx catalyst, and the total mass flow of the reducing agent.

8. The exhaust system of claim 1, wherein the control unit calculates the mass flow of the reducing agent used in the simple oxidation reaction of the reducing agent from the temperature of the DeNOx catalyst, a lambda of an engine outlet, and the total mass flow of the reducing agent.

9. The exhaust system of claim 1, wherein the control unit calculates the NO2 slip efficiency from the aging of the DeNOx catalyst, initial slip efficiency of the DeNOx catalyst, and slip efficiency of the aged DeNOx catalyst.

10. The exhaust system of claim 1, wherein the reducing agent is a fuel, and
    wherein the exhaust system is mounted on the exhaust pipe between the second injector and the DeNOx catalyst and further comprises a fuel cracking catalyst for decomposing the fuel.

11. A method for predicting regeneration of a DeNOx catalyst, comprising:
    determining total mass flow of a reducing agent;
    determining mass flow of the reducing agent used in a nitrate reduction reaction, mass flow of the reducing agent used in a NO2 reduction reaction, and mass flow of the reducing agent which is simply oxidized by using a total mass flow of the reducing agent;

determining mass flow of released NO2 and mass flow of reduced NO2 by using the mass flow of the reducing agent used in the nitrate reduction reaction and the mass flow of the reducing agent used in the NO2 reduction reaction;

determining mass flow of NO2 slipped from DeNOx catalyst;

determining mass of NO2 and mass of NOx remaining at the DeNOx catalyst after regeneration based on the mass flow of the released NO2, the mass flow of the reduced NO2, and the mass flow of the slipped NO2; and initiating a subsequent regeneration of the DeNOx catalyst based on the remaining NOx mass value and NOx mass value.

12. The method of claim 11, wherein the total mass flow of the reducing agent is determined by using utilization efficiency of the reducing agent and mass flow of the injected reducing agent.

13. The method of claim 12, wherein the utilization efficiency of the reducing agent is determined by using mass flow of an exhaust gas and aging of the DeNOx catalyst.

14. The method of claim 11, wherein the mass flow of the reducing agent used in the nitrate reduction reaction is determined by using temperature of the DeNOx catalyst, a lambda of an inlet of the DeNOx catalyst, the mass of the NOx stored in the DeNOx catalyst, and the total mass flow of the reducing agent.

15. The method of claim 11, wherein the mass flow of the reducing agent used in the NO2 reduction reaction is determined by using the mass of the NO2 stored in the DeNOx catalyst, the temperature of the DeNOx catalyst, and the total mass flow of the reducing agent.

16. The method of claim 11, wherein the mass flow of the reducing agent which is simply oxidized is determined by using the temperature of the DeNOx catalyst, a lambda of an engine outlet, and the total mass flow of the reducing agent.

17. The method of claim 11, wherein the mass flow of the NO2 slipped from the DeNOx catalyst is determined by using NO2 slip efficiency, the mass of the NO2 stored in the DeNOx catalyst, and the temperature of the DeNOx catalyst.

18. The method of claim 17, wherein the NO2 slip efficiency is determined by using the aging of the DeNOx catalyst, initial slip efficiency of the DeNOx catalyst, and slip efficiency of the aged DeNOx catalyst.

* * * * *